2,984,633

NOVEL FATTY ACID VARNISHES

Frank J. Hahn, Springfield, Mass., assignor to Monsanto Chemical Company, St. Louis, Mo., a corporation of Delaware No Drawing. Filed July 13, 1956, Ser. No. 597,588

6 Claims. (Cl. 260—23)

This invention relates to novel fatty acid ester varnishes. More particularly, this invention relates to novel fatty acid ester varnishes which are long chain fatty acid esters of reduced interpolymers of vinylidene aldehydes and vinylidene aromatic hydrocarbons.

It is an object of this invention to provide novel fatty acid ester varnishes.

Another object of this invention is to provide novel fatty acid ester varnishes which have high solubilities in aliphatic hydrocarbon solvents.

A further object of this invention is to provide novel fatty acid ester varnishes which have good drying properties.

Yet another object of this invention is to provide novel fatty acid ester varnishes whose films possess good color and high solvent resistance.

Other objects and advantages of this invention will become apparent from the following detailed description thereof.

The above objects are attained by esterifying certain reduced interpolymers of vinylidene aldehydes and vinylidene aromatic hydrocarbons with fatty acids containing 12 or more carbon atoms in their structure. The reduced interpolymers employed, before esterfication, have a molecular weight of 700–10,000, have a hydroxyl content of 4–15 weight percent and contain an average of at least about 3.0 hydroxyl groups per polymer chain.

The following examples are set forth to illustrate more clearly the principle and practice of this invention to those skilled in the art. All parts are by weight.

EXAMPLE I

Part A

An essentially neutral fatty acid ester varnish is prepared by esterifying 59 parts of a reduced styrene-methacrolein interpolymer with 41 parts of linseed oil fatty acids. The resulting ester is dissolved in aliphatic spirits to prepare a 55% solids varnish solution having a Gardner-Holdt viscosity of N.

The reduced styrene-methacrolein interpolymer employed in this example has a molecular weight of 1500, has a hydroxyl content of 5.5 weight percent and contains an average of 4.9 hydroxyl groups per polymer chain. The reduced interpolymer is obtained by catalytically hydrogenating a styrene-methacrolein interpolymer (containing 66 weight percent styrene and having a molecular weight of 1500) over Raney nickel in tetrahydrofurane.

Part B

A mixed cobalt, manganese and lead drier is added in the amount of 0.25% metal to the 55% solids varnish solution prepared in Part A above and panels of tin plate and glass are coated therewith, the coatings being applied to the panels with a doctor blade set at a clearance of 0.003 inch. The coatings air-dry to a non-tacky state in less than 3 hours and the resulting films are hard, flexible and water-white.

Part C

Panels of tin-plate are coated with the 55% solids varnish solution of Part A and baked for 1 hour at 300° F. The resulting films are both flexible and hard, said films having a Sward hardness value of 48. The films have excellent resistance to 4% sodium hydroxide, boiling water and Varsol. Films having still greater resistance to solvents are obtained by incorporating conventional driers in the varnish solution.

EXAMPLE II

An essentially neutral fatty acid ester varnish is prepared by esterifying 59 parts of the reduced styrene-methacrolein interpolymer described in Example I, Part A, with 41 parts of soybean fatty acids. A 50% solution of the ester in aliphatic spirits has a Gardner-Holdt viscosity of G+. The 50% solids varnish solution is evaluated as described in Example I, Parts B and C and essentially comparable results are obtained.

EXAMPLE III

An essentially neutral fatty acid ester varnish is prepared by esterifying 59 parts of a reduced interpolymer of styrene and methacrolein with 41 parts of linseed oil fatty acids. The interpolymer employed contains 66 weight per cent styrene, has a molecular weight of 1500, has a hydroxyl content of 6.0 weight percent and contains an average of 5.3 hydroxyl groups per polymer chain. A 54% solution of the ester in aliphatic spirits has a Gardner-Holdt viscosity of K. The 54% solids varnish solution is evaluated as described in Example I, Parts B and C and comparable results are obtained.

EXAMPLE IV

An essentially neutral fatty acid ester varnish is prepared as described in Example III, except that the linseed oil fatty acids are replaced with soybean fatty acids. A 48% solution of the ester in aliphatic spirits has a Gardner-Holdt viscosity of M. The 48% solids varnish solution is evaluated as described in Example I, Parts B and C and essentially comparable results are obtained.

EXAMPLE V

A reduced styrene-acrolein interpolymer of 1700 molecular weight and 6.0 weight percent hydroxyl content (containing 60 weight percent styrene and an average of about 6 hydroxyl groups per polymer chain) is esterified with, respectively, linseed oil fatty acids, soybean oil fatty acids, and cottonseed oil fatty acids. The quantity of fatty acid employed in each instance is sufficient to esterify all of the hydroxyl groups of the reduced interpolymers. The resulting fatty acid ester varnishes have high solubilities in aliphatic hydrocarbon solvents, have rapid drying properties, and films cast therefrom are hard and water-white.

EXAMPLE VI

A reduced alpha-methyl styrene-acrolein interpolymer of 1600 molecular weight and 8.6 weight percent hydroxyl content (containing 68 weight percent alpha-methyl styrene and an average of 8.1 hydroxyl groups per polymer chain) is esterified with, respectively, linseed oil fatty acids, soybean oil fatty acids and cottonseed oil fatty acids. The quantity of fatty acid employed is such as to esterify substantially all of the hydroxyl groups of the reduced interpolymer. The resulting fatty acid ester varnishes have excellent solubility in aliphatic hydrocarbon solvents. The esters dry rapidly and the films cast therefrom are hard, flexible and water-white.

The fatty acid ester varnishes of this invention are esters derived from fatty acids containing at least 12 carbon atoms in their structure and reduced interpolymers of a vinylidene aldehyde and a vinylidene aromatic hydrocarbon.

The reduced interpolymers employed in the fatty acid ester varnishes are derived from interpolymers of a vinylidene aldehyde of the group consisting of acrolein, methacrolein and mixtures thereof, and a vinylidene aromatic hydrocarbon of the group consisting of styrene, alpha-alkyl styrenes; e.g., alpha-methyl styrene; alpha-ethyl styrene; ring-substituteed alkyl styrenes; e.g., o-, m-, and p-methyl styrenes, o-, m-, and p-ethyl styrenes, 2,4-dimethylstyrene, etc., and alpha-alkyl-ring-substituted alkyl styrenes; e.g., alpha-methyl-p-methyl styrene, etc. The reduced interpolymers are prepared by chemically treating the vinylidene aldehyde-vinylidene aromatic hydrocarbon interpolymers so as to reduce the carbonyl groups thereof to hydroxyl groups. Depending upon the conditions employed in the reduction step, the aromatic rings of the polymer may be either reduced to cyclohexyl groups or left intact. Chemically, the reduced interpolymers consist of essentially linear carbon chains having both aromatic (or cyclohexyl) and hydroxyl groups attached to the chains.

Methods for reducing the carbonyl groups of the vinylidene aldehyde-vinylidene aromatic hydrocarbon interpolymers without substantial reduction of the aromatic ring are described in the copending application of Earl C. Chapin and Raymond I. Longley, Jr., Serial No. 546,774, filed November 14, 1955, which description is incorporated herein by reference. Preferably, such reductions are effected by catalytically hydrogenating the vinylidene aldehyde-vinylidene aromatic hydrocarbon interpolymers over nickel catalysts. For example, such interpolymers are readily reduced in tetrahydrofurane solution at 1500 pounds' hydrogen pressure over Raney nickel at about 175° C. If the temperature and/or hydrogen pressure are increased, the aromatic rings also can be reduced. Alternatively, the carbonyl groups may be reduced by chemical means if desired; e.g., by refluxing the vinylidene aldehyde-vinylidene aromatic hydrocarbon interpolymer with lithium aluminum hydride in suitable solvents such as tetrahydrofurane. The vinylidene aldehyde-vinylidene aromatic hydrocarbon interpolymers themselves are prepared by simply heating a suitable monomer mixture under autogenous pressure at 140–250° C. For further details reference is made to the copending application of Earl C. Chapin and Raymond I. Longley, Jr., Serial No. 546,773, filed November 14, 1955, now Patent Number 2,889,311, issued June 2, 1959, which description is incorporated herein by reference.

The molecular weight and the hydroxyl content of the reduced interpolymer of the vinylidene aldehyde and vinylidene aromatic hydrocarbon must be controlled closely to obtain fatty acid ester varnishes having the desirable physical and chemical properties which characterize the products of this invention. The molecular weight of the reduced interpolymer must fall within the range of 700–10,000 and preferably within the range of 1,000–2,500. The hydroxyl content of the reduced interpolymers must be within the range of 4–15 weight percent and preferably within the range of 6–10 weight percent. The molecular weight and the hydroxyl content of the reduced interpolymers must be such that the reduced interpolymers contain an average of at least three hydroxyl groups per polymer chain and preferably an average of 4.5–7.5 hydroxyl groups per polymer chain. The average number of hydroxyl groups per polymer chain is calculated in accordance with the following equation:

Average No. of hydroxyl groups
$$= \frac{(\text{wt. percent hydroxyl groups})}{(17)(100)} (\text{interpolymer mol wt.})$$

The fatty acids employed in the fatty acid ester varnishes contain at least 12 carbon atoms in their structure. Where drying properties are not required in the esters, e.g., where the esters are to be employed as polymeric plasticizers in lacquers or in conjunction with etherified amino resins, the fatty acids employed may be saturated. Where air-drying properties are required in the esters, the fatty acid employed must contain olefinic unsaturation. While esters having air-drying properties may be prepared from fatty acids containing a single olefinic bond such as, for example, oleic acid, lauroleic acid, palmitoleic acid, or gadoleic acid, it is preferable to employ a more highly unsaturated fatty acid such as linoleic or linolenic acid. Particularly suitable are the drying oil fatty acids obtained as a mixture of individual acids by hydrolysis of natural drying oils such as linseed oil, soybean oil, dehydrated castor oil, perilla oil, tung oil, cottonseed oil, and the like. Also the unsaturated fatty acids obtained by heating drying oils so as to effect conjugation of the double bonds as by alkali isomerization are very suitable for the preparation of the fatty acid ester varnishes of this invention. Preferably, where unsaturated fatty acids are employed, they should have an iodine number of about 85 or higher.

The mol ratio of fatty acid to reduced vinylidene aldehyde-vinylidene aromatic hydrocarbon interpolymer to be employed in the preparation of the fatty acid ester varnishes may be varied widely. In the preparation of air-drying esters, the ratio of unsaturated fatty acids to reduced vinylidene aldehyde-vinylidene aromatic hydrocarbon interpolymer may be varied from a quantity sufficient to esterify essentially all of the hydroxyl groups of the interpolymer to as little as about 1.5 mols of fatty acid per mol of reduced interpolymer. In the preparation of fatty acid ester varnishes to be employed in coating compositions in conjunction with other film-forming resins, e.g., with melamine-formaldehyde resins, it is desirable to employ less than a fully stoichiometrically equivalent quantity of fatty acid so as to retain free hydroxyl groups in the ester, which hydroxyl groups remain free to react with functional groups of other film-forming resins. More viscous and modified fatty acid ester varnishes can be prepared by including a small quantity of polybasic acid in the esterification reaction, e.g., phthalic anhydride or one of the dimer or trimer fatty acids.

A highly desirable characteristic of many of the fatty acid ester varnishes of this invention is their high solubility in aliphatic solvents. High solubility in aliphatic solvents is of prime importance in the manufacture of coating compositions that are to be used for painting interior surfaces, since in many cases toxicity considerations preclude the use of aromatic solvents in such compositions.

The above descriptions and examples are set forth by way of illustration only. Many other variations and modifications thereof will be obvious to those skilled in the art and can be made without departing from the spirit and scope of the invention herein described.

What is claimed is:

1. An air drying ester formed from reactants consisting solely of one molar proportion of an essentially linear polymer containing hydroxyl groups and at least 1.5 molar proportions of unsaturated monobasic fatty acids containing at least 12 carbon atoms and having an iodine number of at least 85, said polymer having a molecular weight of 700–10,000, a hydroxyl content of 4–15 weight percent and containing an average of at least 3.0 hydroxyl groups per polymer chain, said polymer having been prepared by subjecting a binary interpolymer of at least 60 weight percent of an alpha,beta ethylenically unsaturated aromatic hydrocarbon and not more than 40 weight percent of an alpha,beta ethylenically unsaturated aldehyde to reducing conditions of sufficient severity to reduce substantially all of the carbonyl groups of the interpolymer to hydroxyl groups, the alpha,beta ethylenically unsaturated aromatic hydrocarbon included in said polymer being selected from the group consisting of styrene, alpha-alkyl styrenes, ring-substituted alkyl styrenes, alpha-alkyl ring substituted alkyl styrenes and mixtures thereof, the alkyl groups in said alkyl-substituted styrenes containing up to 2 carbon atoms and being the only substituent group present therein, the alpha,beta ethylenically unsaturated aldehyde included in said polymer being selected from the group consisting of acrolein, methacrolein and mixtures thereof.

2. Esters as in claim 1 wherein the molecular weight of the interpolymer is from about 1,000 to about 2,500.

3. Esters as in claim 2 wherein the interpolymer that is reduced is a styrene-acrolein interpolymer.

4. Esters as in claim 3 wherein the fatty acid portion thereof is derived from linseed oil fatty acids.

5. Esters as in claim 3 wherein the fatty acid portion thereof is derived from soybean oil fatty acids.

6. Esters as in claim 3 wherein the fatty acid portion thereof is derived from cottonseed oil fatty acids.

References Cited in the file of this patent

UNITED STATES PATENTS

| | | |
|---|---|---|
| 2,256,152 | Nutting et al. | Sept. 16, 1941 |
| 2,478,154 | Evans | Aug. 2, 1949 |
| 2,634,256 | Sparks | Apr. 7, 1953 |
| 2,651,624 | Swart | Sept. 8, 1953 |
| 2,657,192 | Miller et al. | Oct. 27, 1953 |
| 2,809,185 | Hearne et al. | Oct. 8, 1957 |
| 2,809,186 | Smith et al. | Oct. 8, 1957 |

OTHER REFERENCES

Shell Chemical Corp. Technical Publication SC: 46–32 (1946), pages 26–31.